Nov. 11, 1930.  L. A. HILL  1,781,639
COLLAR FASTENER
Filed Feb. 12, 1930
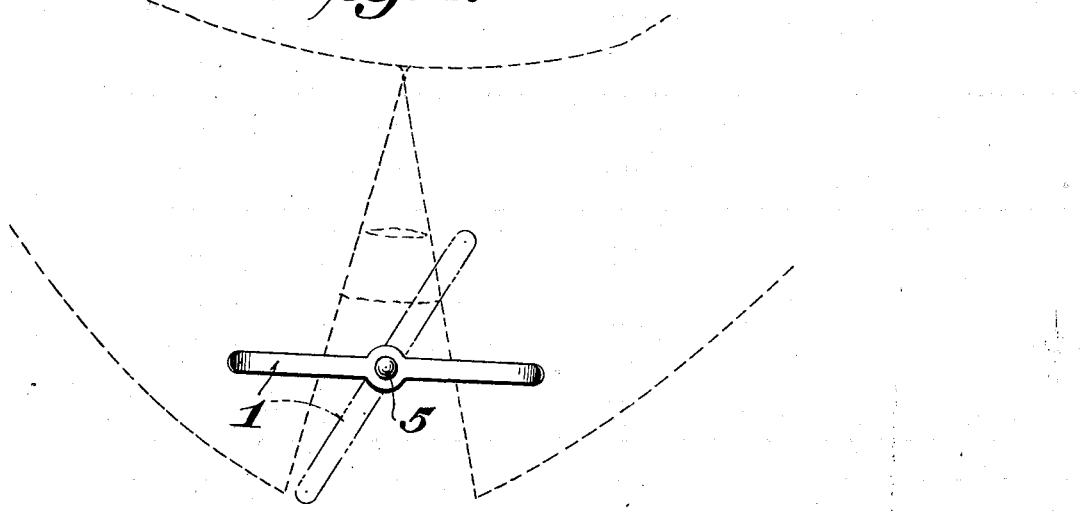
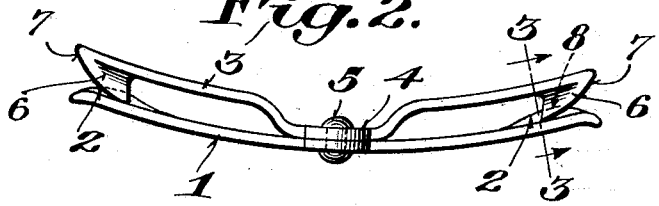
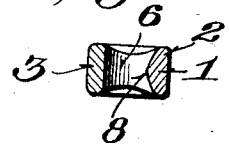 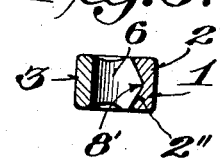
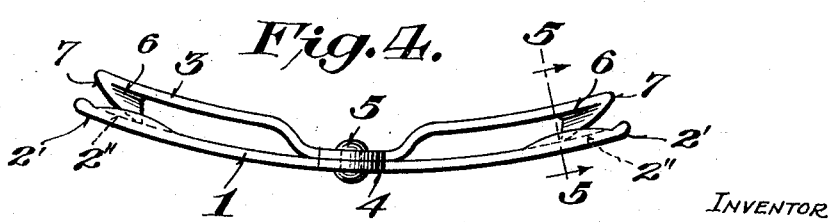
INVENTOR
Louis A. Hill,
BY
ATTORNEY Patented Nov. 11, 1930

1,781,639

UNITED STATES PATENT OFFICE

LOUIS A. HILL, OF WASHINGTON, DISTRICT OF COLUMBIA

COLLAR FASTENER

Application filed February 12, 1930. Serial No. 427,816.

This invention relates to collar fasteners and the primary object thereof is to provide a fastener which engages the collar ends in a manner so as to hold the fastener against movement relative to said ends, and which can only be disengaged or released from each of the collar ends by a single or bodily movement of a part of the fastener.

A further object of the invention is to provide a fastener of this character, wherein when the collar engaging parts occupy normal position, the ends of the collar can be easily and quickly engaged with the fastener, and upon movement of the said parts out of alinement, the collar ends are simultaneously released.

A further object of the invention is to provide a fastener in which the collar ends are held by lateral deflection of parts thereof, so as to positively clinch and grip the cloth with somewhat the manner of a biting effect.

Further, the invention aims to produce a device of this character which can be economically produced, easily and quickly assembled, and also easily and quickly operated in both applying and removing same from the collar.

In the drawings:

Fig. 1 is a front elevation of the invention showing same applied to a collar and illustrating in dotted lines the position of the parts in removal of the fastener from the collar;

Fig. 2 is a top plan view of Fig. 1;

Fig. 3 is a section on line 3—3 of Fig. 2 but with the parts in a position at 90° to the position shown in Fig. 2;

Fig. 4 is a view similar to Fig. 2 of a slightly modified form of the invention but with the parts in a position at 90° to the position shown in Fig. 2; and Fig. 5 is a section on line 5—5 of Fig. 4.

In proceeding in accordance with the present invention, a front bar or member 1 is employed which as shown in Figs. 1 to 3, has its ends formed with keepers 2 that are of convex cross section and which are curved longitudinally of the bar.

A rear bar or member 3 has its central portion offset as indicated at 4 and is pivoted by means of a stud 5 to the front bar 1 so that the front bar may be swung about the stud 5 as a pivot from a position in which same registers with the bar 3 to that shown in Fig. 1 in dotted lines. Each of the ends of the bar 3 is formed with a hook-like projection 6 having curved outer sides or noses, to generally conform to the curvature of the free ends of the keepers 2 thereby to provide V-shaped spaces to facilitate positioning of the collar relative to the fastener. As shown in Fig. 3 of the drawings the members or projections 6 are formed with V-shaped cutouts 8 so as to conformably engage the keepers 2, thereby to deform the collar ends and to cause same to be conformably held by and between the cutouts 8 and the convex portions 2 of the keepers. In this manner the collar ends are pinched or are held by virtue of the biting action of the parts 2 and 8, so as to prevent the fastener from becoming accidentally disengaged with respect to the collar or to shift or move relative to the collar.

The modification shown in Figs. 4 and 5 merely differs from the preferred form of the invention in that the keepers designated 2' are formed with concave upper faces 2" and the hook-like projections 6 are formed with substantially V-shaped portions 8' which conformably engage in the concavities 2" of the keepers 2'. In either form of the invention it will be noted that the hooks act to literally bite into the collar ends and cause the fastener to effectually grip such ends, with minimum possibility of the fastener being accidentally disengaged, or shifted from, its normal or operative position.

In operation, the bars 1 and 3 are moved so as to be brought into register, as shown in Fig. 1 in full lines and in the remaining figures. Due to the connection at 5 between the two bars and their spring properties, the fastener can be easily applied by mere relative sliding movement between the collar ends and the fastener ends. However, when the fastener is engaged with the collar ends as shown in Fig. 1 it will be noted that due to the biting of the hooks 6 into the collar such ends will be deformed or in other words will have laterally deflected portions which are tightly held by and between the hooks 6 and the keepers 2, and which collar portions conform to the shape of the hooks and keepers, thus firmly and rigidly holding the fastener in position and against accidental movement. In order to remove the fastener, it is merely necessary to swing the front bar 1, relative to the other as shown in dotted lines in Fig. 1, whereby it will be seen that the collar ends will be simultaneously released, and in order to again apply the fastener it is merely necessary to restore the members 1 and 3 to their registered positions as aforementioned.

What is claimed is:

1. In a collar fastener, a front member having keepers at its ends, and a rear member pivoted intermediate its ends to the front member, the ends of said rear member having hook-line projections formed to bite into the collar ends and to require bodily turning of the front member to release said collar ends.

2. In a collar fastener, a front member, a rear member pivoted intermediate its ends to the front member, and means carried by the ends of the front and rear members to bite into the ends of a collar on opposite sides thereof so as to clinch the collar ends and require bodily turning of the front member to release the collar ends.

3. In a collar fastener, a front member, a rear member pivoted intermediate its ends to the front member, and means carried by the ends of the front and rear members to have such holding engagement with the collar ends so as to require bodily turning of the front member to release the collar ends.

4. In a collar fastener, a front member, a rear member, means carried by the end parts of the members to grip the ends of the collar therebetween, and means to connect the members whereby to enable one of same to be rotatably moved relative to the other so as to release the collar ends.

In testimony whereof I affix my signature.

LOUIS A. HILL.